US012346379B2

(12) United States Patent
Han et al.

(10) Patent No.: US 12,346,379 B2
(45) Date of Patent: Jul. 1, 2025

(54) COLD START MACHINE LEARNING BASED DATABASE QUERY RETRIEVAL

(71) Applicant: A9.com, Inc., Palo Alto, CA (US)

(72) Inventors: Cuize Han, Union City, CA (US); Parth Gupta, Gandhinagar (IN); Xu Xu, Mountain View, CA (US); Pablo Castells, Madrid (ES)

(73) Assignee: A9.com, Inc., Palo Alto, CA (US)

( * ) Notice: Subject to any disclaimer, the term of this patent is extended or adjusted under 35 U.S.C. 154(b) by 177 days.

(21) Appl. No.: 17/663,638

(22) Filed: May 16, 2022

(65) Prior Publication Data
US 2023/0367818 A1    Nov. 16, 2023

(51) Int. Cl.
*G06F 16/903* (2019.01)
*G06N 20/00* (2019.01)

(52) U.S. Cl.
CPC ....... *G06F 16/90335* (2019.01); *G06N 20/00* (2019.01)

(58) Field of Classification Search
CPC ................. G06F 16/90335; G06N 20/00
See application file for complete search history.

(56) References Cited

U.S. PATENT DOCUMENTS

| | | | | |
|---|---|---|---|---|
| 8,301,764 | B2* | 10/2012 | Konig | G06N 20/00 |
| | | | | 709/224 |
| 8,682,812 | B1* | 3/2014 | Ranjan | H04L 43/028 |
| | | | | 706/12 |
| 10,356,244 | B1* | 7/2019 | Sengupta | H04L 43/045 |
| 2008/0059508 | A1* | 3/2008 | Lu | G06F 18/24155 |
| | | | | 707/999.102 |
| 2016/0188725 | A1* | 6/2016 | Wang | G06F 16/9535 |
| | | | | 707/734 |
| 2016/0350802 | A1* | 12/2016 | Mehanian | G06Q 30/0254 |
| 2017/0286979 | A1* | 10/2017 | Chavez | H04N 7/16 |
| 2022/0417261 | A1* | 12/2022 | Rashidi | G06F 16/245 |

* cited by examiner

*Primary Examiner* — Tony Wu
(74) *Attorney, Agent, or Firm* — Knobbe, Martens, Olson & Bear, LLP

(57) ABSTRACT

System and methods are provided that can address cold-start problems in database keyword searches. The search system generates machine-learned values for new item and queries based on historical signals for already existing item and queries. The values are used as input in a ranking model to rank search results for a user query. The initial values for the new item query pairs predict user engagement with the new item query pairs based on historical data for existing item query pairs and increase the visibility of new items to accumulate user interaction data for the new items. After additional user interactions are received, the values are updated using a Bayesian formula.

20 Claims, 5 Drawing Sheets

COLD START MACHINE LEARNING BASED DATABASE QUERY RETRIEVAL

BACKGROUND

In a database context, ranking can be an integral part of information retrieval. Machine learning techniques can be used to create ranking models for search systems, which are often referred to as learning to rank or machine-learned ranking. Learning-to-rank models can rely on several features to rank query results. The features can be based on users' interactions with items, which can be referred to as behavioral features. The training data can include items, queries, query results, and historical data, such as previous users' interactions that can indicate user engagement with the results of a query. The training data can be used by a machine learning algorithm to produce a ranking model that computes the relevance of query results. A user can enter a search query, the ranking model can be applied to some items to determine the ranking of items, and the results can be presented based on the ranking.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
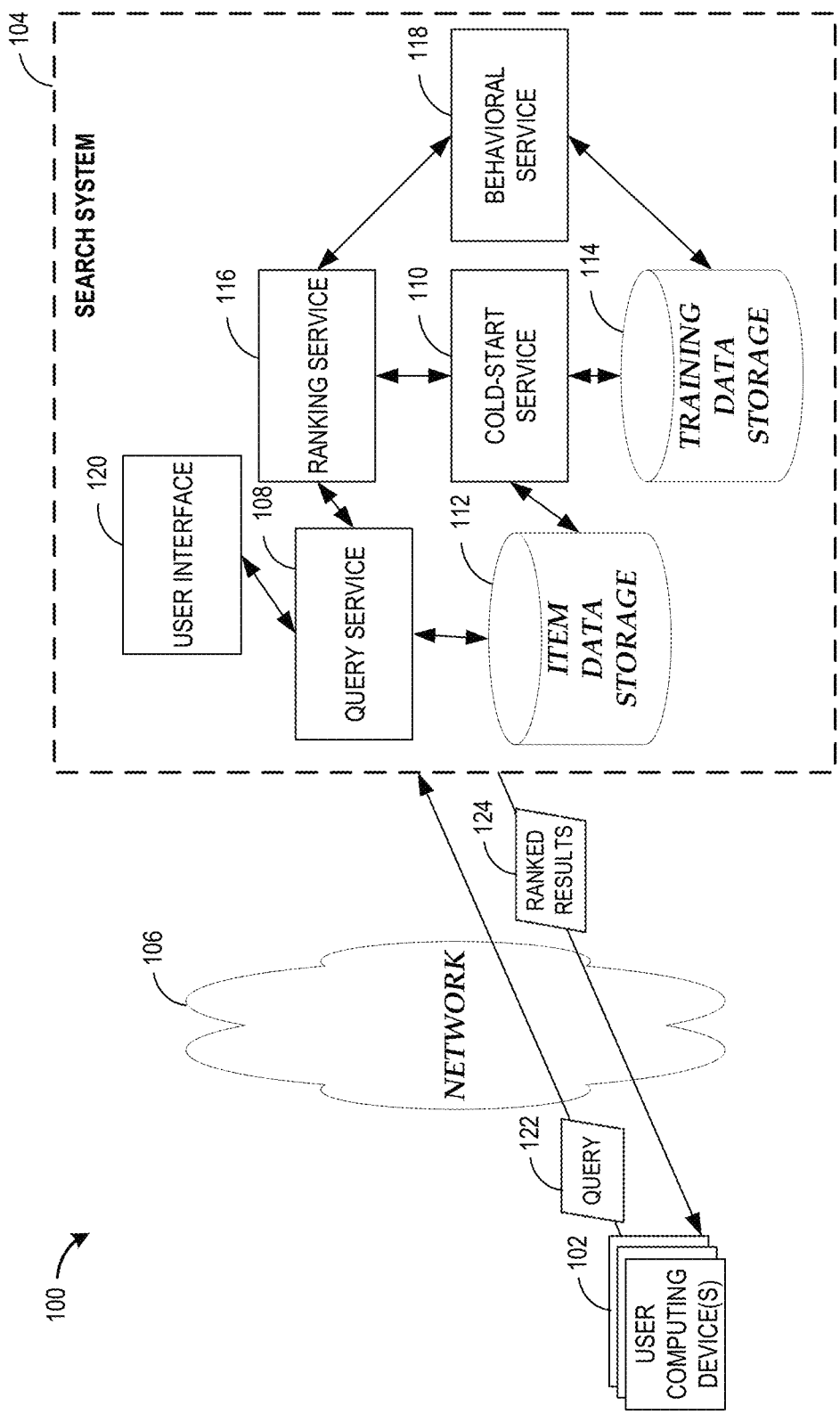
FIG. 1 is a schematic block diagram depicting an illustrative network environment for implementing a search system.

As described above, existing search systems can use learning-to-rank based ranking models. The existing systems can use training data in a machine learning algorithm to produce a ranking model that computes the relevance of query results. The learning-to-rank features can be based on users' interactions with items. However, there is a bias against new items due to a reliance on historical signals in these ranking systems. In particular, the ranking models can be trained for user engagement, which can favor behavioral features (such as clicks or impressions). This approach to information retrieval can lead to the following dilemma or cycle: a lack of behavioral data for new items can result in a low ranking for the new items, which can result in the new items accruing less behavioral data over time relative to higher ranked items that can cause the new items to remain unduly low in the rankings for some time. This dilemma can be referred to as the cold-start problem.

Generally described, aspects of the present disclosure are directed to improved search systems and methods that can address cold-start problems. The search system can generate machine-learned values for new item query pairs based on historical signals for already existing item query pairs. An item query pair can include at least an item and a query. At some time a user can submit a query and the item can be identified as a search result for the query. These initial values (also referred to herein as prior prediction values) can be generated at the time of the new item's inclusion in the search index. The values can be used as input in a ranker (such as a ranking model) to rank search results for a user query. When historical signals are received for the recent item query pairs, a posterior prediction value can be calculated using an empirical Bayes method and the historical signals. The ranker can receive the posterior prediction value to rank search results. This approach can have several advantages, such as, but not limited to, supporting a machine learning model that outputs predicted values based on the input query, predicting user engagement with new items based on historical data for existing items, potentially increasing the visibility of new items to accumulate user interaction data for the new items, and more accurate predictions through the use of Bayesian calculations.

Some existing search systems can use machine learning algorithms for search such as machine-learned ranking. The existing systems process items and metadata associated with the items. The system can process new items as they are added to the system. Posterior prediction values can be determined for each item from historical user interaction data for the items using a machine learning model. The posterior prediction values can be used by a ranking service to rank query results. However, since posterior prediction values are based on the historical user interaction data and new items do not have historical user interaction data, then the posterior prediction values for new items can be zero. Accordingly, existing search systems can suffer from cold-start issues as described herein.

Instead of using machine learning algorithms to address cold-start issues, some existing search systems can rely on manual curation. For example, a new music album, titled "Pomegranate," is going to be released and made available on an existing search system. An existing search system can highly rank search results for the user query with the search parameter "pomegranate" with items from a drink and supplement categories (such as a pomegranate juice or a pomegranate extract supplement) based on posterior prediction values for those items. Since the "Pomegranate" album item is new, its posterior prediction value(s) will be zero and the album item would be low in the ranking of the search results. However, an administrator can set a prediction value for the new item to a number, such as the numerical value thirteen or fourteen, to manually boost the item's visibility in the search results. Another example of manual curation can include an administrator estimating the number of acquisitions for a new item. However, manual curation can be time-consuming, impractical for a large number of items, error prone, arbitrary, and/or inefficient.

In the search context, behavioral features can be useful for relevance estimation. Using behavioral features in a learning-to-rank system can be effective because of their ability to encode user behavior. However, behavioral features can take a relatively long time to learn (need many impressions to attain high values) and unlearn (until some other items receive higher values). This phenomenon can adversely affect new items because they have zero to minimal behavioral data. In some existing systems, it takes time for new items to gather enough historical signals to gain higher positions in the ranking. For example, a newly released movie (for example, movie "X") in a popular movie series (for example, series "Y") should be ranked higher compared to old movies from the same series for a search query that includes the name of the series (for example, "Y movie"), despite the fact that the old movies would have rich historical data due to their age. In some existing systems, items, including the highly engaging ones, tend to take a fair amount of time before steadily reaching their highest-ranking position. Amplitude and steepness of ranking climb vary depending on the number of impressions, acquisitions, and/or user selections received by an item.

The systems and methods described herein may improve information and/or database retrieval technology. The solutions described herein may address the technical deficiencies of learning-to-rank algorithms with respect to the cold-start issues described herein. Machine learning algorithms that apply regression models to historical data can classify new items based on similar attribute values with existing items. This approach can advantageously break the zero-feedback loop of existing learning-to-rank models for new items that fail to generate user interaction data. When a relatively minimal amount of user interaction data is received, a Bayesian formula can be applied to a prior to quickly calculate a posterior, which can result in improved ranking for newer items. Since a Bayesian formula can be applied after a relatively minimal amount of user interaction data is received, this approach can advantageously result in promoting newer items quicker than other ranking approaches that rely exclusively on training new machine learning models, which can take longer than the Bayesian calculation approaches described herein. Moreover, the technical solutions described herein can obviate the need for administrators to manually set prediction values that can be a time-consuming, error prone, arbitrary, and/or inefficient process. Rather, the machine learning and prediction algorithms described herein can enable new items to be efficiently and/or programmatically ranked, which did not occur in existing systems. Thus, the systems and methods described herein can improve over traditional information retrieval techniques.

As used herein, the term "item" can refer to a data object that can represent a specific thing that has a number of definable attributes. For example, an item can represent things such as, but not limited to, a physical product, a digital product, and/or an electronic document. In an information retrieval context, "item" as used herein can be synonymous with a "document." The term "item" is used interchangeably to refer to an item itself (e.g., a particular product or particular digital content) and to its description or representation in a computer system or electronic catalog. As will be apparent from the context in which it is used, the term is also sometimes used herein to refer only to the item itself or only to its representation in the computer system. Example items can be music albums, audiobooks, books, movies, television shows, and/or other media products in either an electronic format or physical format. Example items can also be electronic or digital, such as an electronic service or any electronic content provided by a buyer to a seller in which a physical good is not transferred. Users can interact with items. For example, a user can select an item in a user interface to view details about the item. A user can acquire an item. A user can also consume an item, such as by watching a movie or listening to a music album. While some aspects of the disclosure may describe an example regarding a "new item," the same disclosure may also apply to an existing item but that has minimal or no user interaction data.

Examples attributes of an item can include an author, a title, artist, brand, studio, writer, product type, director, subject, genre, and/or browse node in a hierarchy of an electronic catalog. A browse node attribute can identify an item's location in a catalog's hierarchy. For example, a media item, such as a novel, can have a browse node attribute value of "Sub-sub-category Z" and/or "Category X>Sub-category Y>Sub-sub-category Z" (for example, "Ancient" and/or "Fiction>Literature>Historical Fiction Time Periods>Ancient"). As described below, the search system can be included in an electronic catalog system with many items and categories of items.

In some embodiments, an electronic catalog system, as described herein, may include or be in communication with a data store of information about items that may be listed for sale, lease, etc. by an electronic marketplace, sellers, merchants and/or other users. The item information in this data store may be viewable by end users through a browsable or searchable electronic catalog in which each item may be described in association with a network page, such as an item detail page, describing the item. Each item detail page may include, for example, an item image and description, customer ratings, customer and professional reviews, sales rank data, lists of related items, and/or other types of supplemental data that may assist consumers in making informed purchase or acquisition decisions. A network page can be provided that enables users to interact with items, such as selecting, acquiring, or consuming items (such as watching or playing a media content item). Users of the system may, in some embodiments, locate specific item detail pages within the electronic catalog by executing search queries, navigating a browse tree, and/or using various other navigation techniques.

As used herein, the term "posterior prediction value" can refer to an assigned likelihood of user engagement with an item as a query result and/or estimated desirability of an item as a query result after relevant evidence and/or background is taken into account. The term "posterior prediction value" can be used interchangeably with "posterior" or "posterior probability," especially in a Bayesian context. As described herein, a posterior prediction value for an item query pair can be based on previous user interaction data with the specific item and query pairs.

As used herein, the term "prior prediction value" can refer to an assigned likelihood of user engagement with an item as a query result and/or estimated desirability of an item as a query result before some evidence and/or background is taken into account or even exists for the specific item. The term "prior prediction value" can be used interchangeably with "prior" or "prior probability," especially in a Bayesian context. As described herein, a prior prediction value for an item query pair can be based on previous user interaction data with different item query pairs. In particular, a prior can be assigned where attributes(s) of an item query pair with the user interaction data can correspond (such as by being the same or similar to) to attribute(s) of another item query pair lacking user interaction data.

As used herein, the term "behavioral feature" can refer to a type of user engagement. Example behavioral features can include, but are not limited to, a user selection rate feature (such as a click rate), an acquisition rate feature (such as a purchase rate), a consumption rate feature, an acquisition share factor feature, or a consumption share factor, which are described in further detail below. The behavioral features can be based on historical signals that indicate previous user interactions with item query pairs, such as selection, acquisition, or consumption. The prior prediction value and/or the posterior prediction value can be for a particular behavioral feature.

Turning to FIG. 1, an illustrative network environment 100 is shown in which a search system 104 may rank items with minimal or non-existent historical data. The network environment 100 may include one or more user computing devices 102 and the search system 104. The search system 104 may include a user interface 120, a query service 108, a cold-start service 110, a ranking service 116, a behavioral service 118, an item data storage 112, and a training data storage 114. The constituents of the network environment 100 may be in communication with each other either locally or over a network 106. While certain constituents of the network environment 100 are depicted as being in communication with one another, any constituent of the network environment 100 can communicate with any other constituent of the network environment 100; however, not all of these communication lines are depicted in FIG. 1. For example, the ranking service 116 can communicate with the item data storage 112 and/or the training data storage 114 and the behavioral service 118 can communicate with the item data storage 112.

The cold-start service 110 can train machine learning models based on historical data associated with existing item query pairs and attributes from the item query pairs. Thus, the cold-start service 110 can communicate with the item data storage 112 and/or the training data storage 114. The cold-start service 110 can process new items in queries, which can include applying the machine learning model to the new items and queries. The output of the machine learning models can be used as input to the ranking service 116. User interaction data can be received for the new items and queries. A posterior can be generated according to a Bayesian method using the interaction data. In some embodiments, an advantage of the cold-start service 110 calculating the posterior value being using a Bayesian method is that the calculated posterior can be a more reliable predictor than a posterior output from a machine learning model because there may be insufficient behavioral data for the model to output a high-quality predictor. The user interaction data for items and queries (such as historical signals) can be stored in the item data storage 112 and/or the training data storage 114.

The behavioral service 118 can train machine learning models based on item query pairs and attributes with sufficient historical data. The ranking service 116 can use the output (posteriors) from the behavioral service 118 for item query pairs based on a determination that the behavior model(s) should be used instead of the cold-start model(s) from the cold-start service 110.

Example user computing devices 102 can include a laptop or tablet computer, personal computer, personal digital assistant (PDA), hybrid PDA/mobile phone, smart wearable device (such as a smart watch), mobile phone, and/or a smartphone. A user can submit, via the user computing device 102, a query 122 to the search system 104, such as by using the user interface 120. The query service 108 can retrieve query results from the item data storage 112. The ranking service 116, in communication with the cold-start service 110 and/or the behavioral service 118, can rank the query results using a ranking model. The ranked query results 124 can then be presented on the user interface 120.

Users, via the user computing device 102, can further interact with items via the user interface 120 as described herein. While not illustrated in FIG. 1, in some embodiments, the user interface 120 may be executed client-side at the user computing device 102. For example, an application can execute on the user computing device 102 that presents the user interface 120.

The item data storage 112 and/or the training data storage 114 may be embodied in hard disk drives, solid state memories, any other type of non-transitory computer-readable storage medium. The item data storage 112 and/or the training data storage 114 may also be distributed or partitioned across multiple local and/or remote storage devices. Each of the item data storage 112 and/or the training data storage 114 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP.

The user computing devices 102 and the search system 104 may each be embodied in a plurality of devices. For example, the user computing devices 102 and the search system 104 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the user computing devices 102 and the search system 104. The memory generally includes RAM, ROM, and/or other persistent and/or auxiliary non-transitory computer-readable storage media.

Additionally, in some embodiments, the search system 104 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 2:
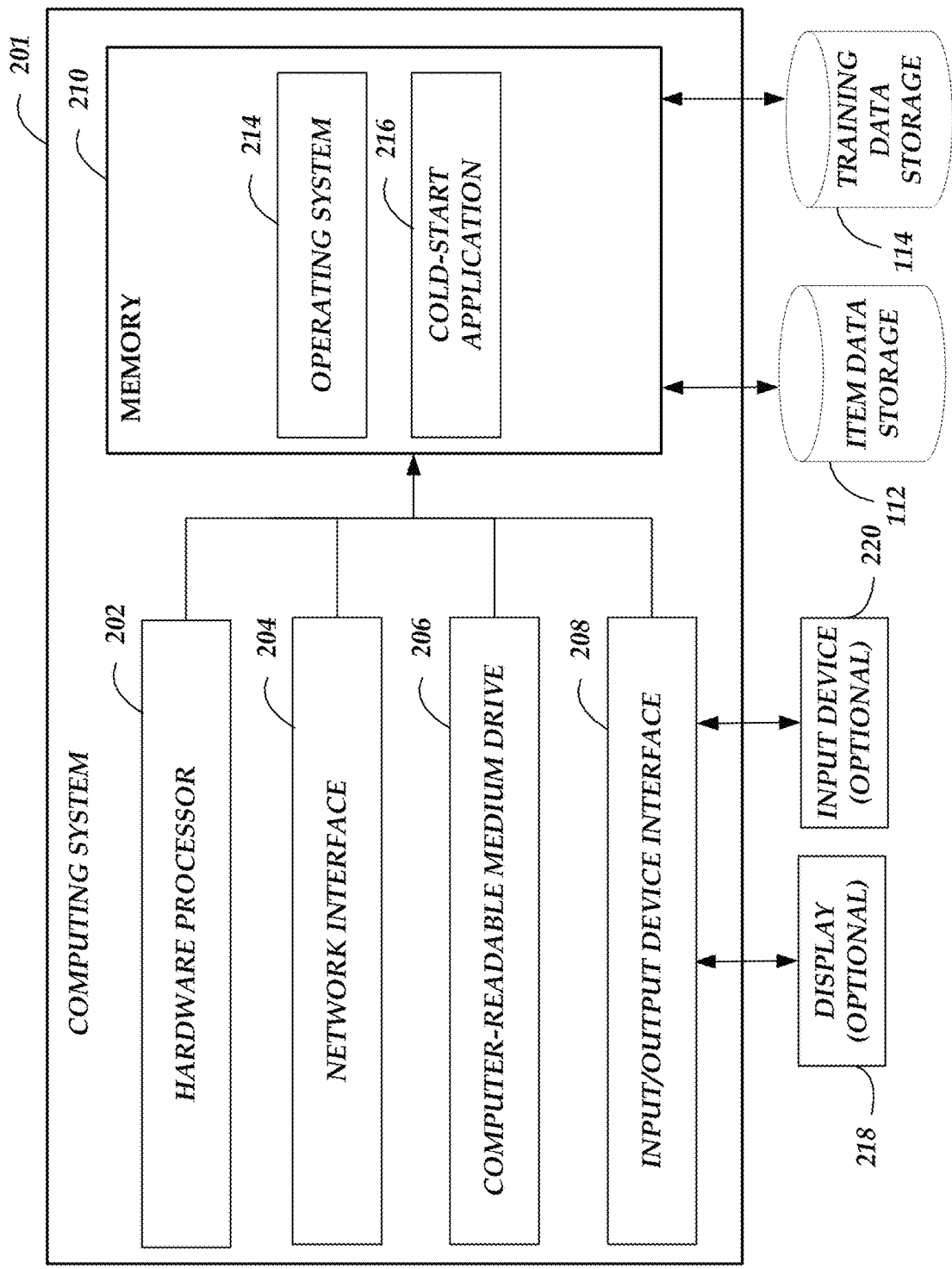
FIG. 2 is a schematic diagram depicting an illustrative general architecture of a computing system for implementing the cold-start service referenced in the network environment depicted in FIG. 1.

FIG. 2 is a schematic diagram of an illustrative general architecture of a computing system 201 for implementing the cold-start service 110 referenced in the environment 100 in FIG. 1. The computing system 201 includes an arrangement of computer hardware and software components that may be used to implement a cold-start service 110. While the general architecture of the computing system 201 is shown and described with respect to FIG. 2, the general architecture of FIG. 2 can be used to implement other services and/or devices described herein, such as the user computing device 102, the query service 108, the ranking service 116, and/or the behavioral service 118. The computing system 201 may include more (or fewer) components than those shown in FIG. 2. Further, other computing systems described herein may include similar implementation arrangements of computer hardware and software components.

The computing system 201 for implementing the cold-start service 110 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. In other embodiments, the display 218 and input device 220 may be included in the user computing devices 102 shown in FIG. 1. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 208 may also output audio data to speakers or headphones (not shown).

The memory 210 may contain specifically configured computer program instructions that the hardware processor 202 executes in order to implement one or more embodiments of the cold-start service 110. The memory 210 generally includes RAM, ROM and/or other persistent or non-transitory computer-readable storage media. The memory 210 may store an operating system 214 that provides computer program instructions for use by the hardware processor 202 in the general administration and operation of the cold-start service 110. The memory 210 may further include other information for implementing aspects of the cold-start service 110. For example, the memory 210 may communicate with the item data storage 112 and/or the training data storage 114. In some embodiments, the item data storage 112 and/or the training data storage 114 may store one or more data structures or objects that can also be loaded into the memory 210.

The memory 210 may include a cold-start application 216 that may be executed by the hardware processor 202. In some embodiments, the cold-start application 216 may implement various aspects of the present disclosure. For example, the cold-start application 216 may train a machine learning model to generate priors using attributes from items, queries, and historical signals. In some embodiments, the cold-start application calculates a prior for items with minimal user interaction data using a Bayesian method.

Figure 3:
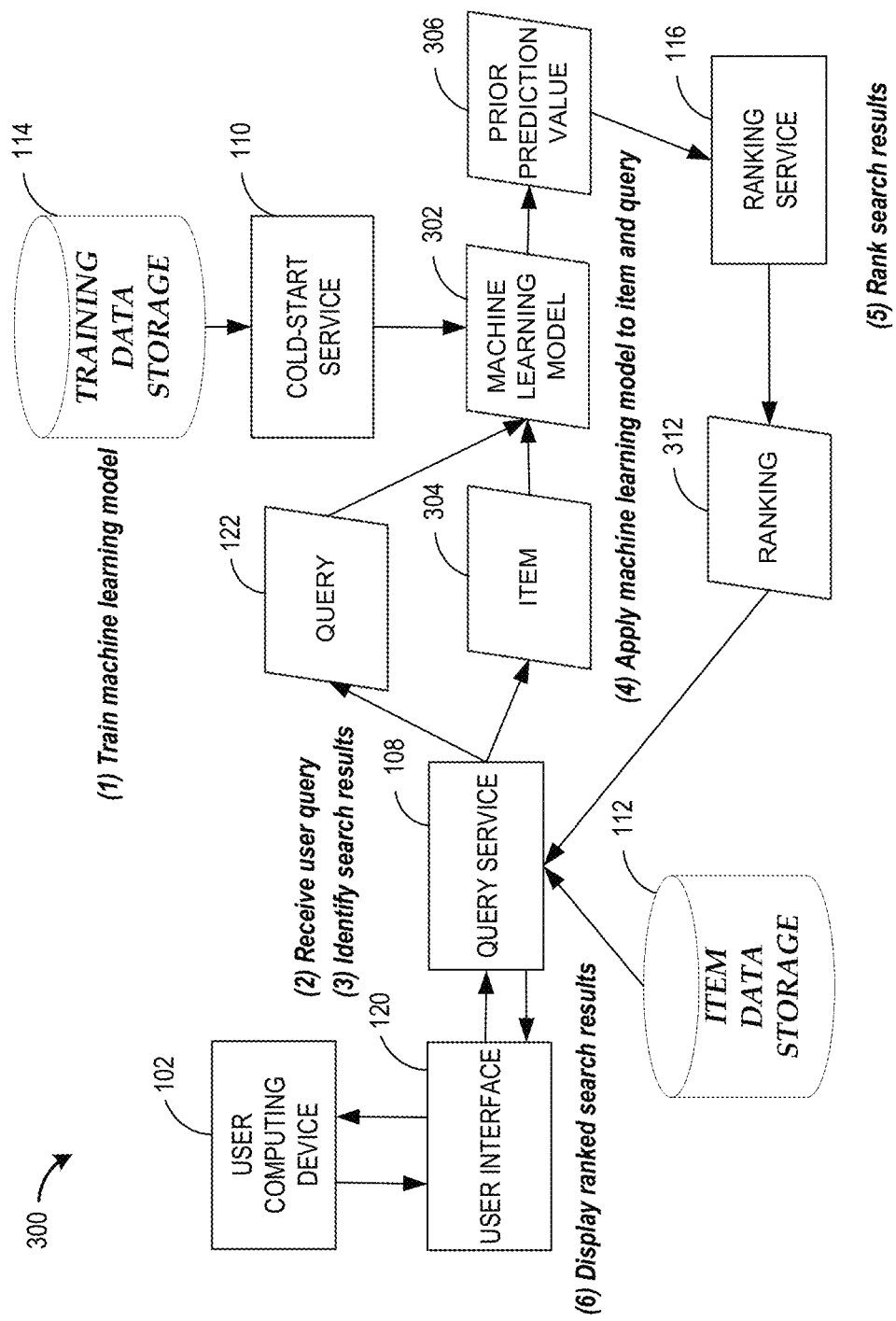
FIG. 3 is a flow diagram depicting illustrative interactions for ranking items lacking user interaction data.

With reference to FIG. 3, illustrative interactions are depicted for ranking items lacking user interaction data. The environment 300 of FIG. 3 can be similar to the environment 100 of FIG. 1. The depicted interactions in FIG. 3 are example interactions, some or all of which may be optional depending on the circumstances or embodiment. Other interactions (not illustrated) may be possible in accordance with the present disclosure in other embodiments. Similar to the communication depictions of FIG. 1, not every possible communication may be depicted in FIG. 3.

The interactions of FIG. 3 begin at step one (1) where the cold-start service 110 can train a machine learning model 302 based on training data. The machine learning model 302 can be formulated as a regression analysis. In particular, the machine learning model 302 can be or include a linear regression model and/or a logistic regression model. The training data can include attributes for existing item and query pairs. The cold-start service 110 can generate a feature vector from attribute data for each item. The training data can further include interaction data, such as a user selection, user acquisition, or user consumption rate, which can be referred to as behavioral data. Historical signals for attributes can be used to train the model, such as a historical number of selections for a particular brand received over a fixed window period, a number of times movies of an actor were consumed, or a number of acquisitions for a particular author. The cold-start service 110 feeds the historical signals to the machine learning model 302 to learn interactions between such attributes and a behavioral feature, which would serve as a prior for a new item and query. The machine learning model 302 is conditioned on the items' metadata and corresponding queries.

At step two (2), the user interface 120 can receive a query (later shown as the query 122 used by the query service 108) from the user computing device 102. An example query 122 can be a keyword search for items. At step three (3), the query service 108 can identify search results from the item data storage 112. The query service 108 can use a natural language and/or keyword search to retrieve the search results.

At step four (4), after the cold-start service 110 trains the machine learning model 302, the cold-start service 110 can apply the machine learning model 302 to an item 304 and the query 122 pair. The item 304 is a new item that lacks user interaction data. In particular, input to the machine learning model 302 can be a vector of featurized attributes for the item 304 and query 122 pair and output of the machine learning model 302 can be the prior prediction value 306. The prior prediction value can be for a behavioral feature (such as a user selection rate). The cold-start service 110, via the machine learning model 302, can assign prior prediction values to new items and pairs that predict user engagement with or desirability of the new items. The likelihood of user engagement and/or desirability may be estimated based on historical signals on the attributes of the new item 304, such as brand, type, color, artist, author, etc., and the query 122.

At step five (5), the search results can be ranked by the ranking service 116. In particular, the ranking service 116 can apply a ranking model (not illustrated), such as a learning-to-rank model, that receives the prior prediction value 306 for the new item 304 and the query 122 as input in addition to a list of other item query pairs with respective prior prediction or posterior prediction values. The ranking model can use the prior prediction value 306 instead of a posterior prediction value (which would be zero due to the lack of interaction data for a new item, e.g., a cold start) for the new item 304 and the query 122 pair. Output of the ranking model can be a ranking 312 of the search results for the query 122. At step six (6), the user interface 120 can display at least some of the search results according to the ranking 312. As described herein, the search results can include new items despite the lack of interaction data due to the prior prediction values.

Figure 4:
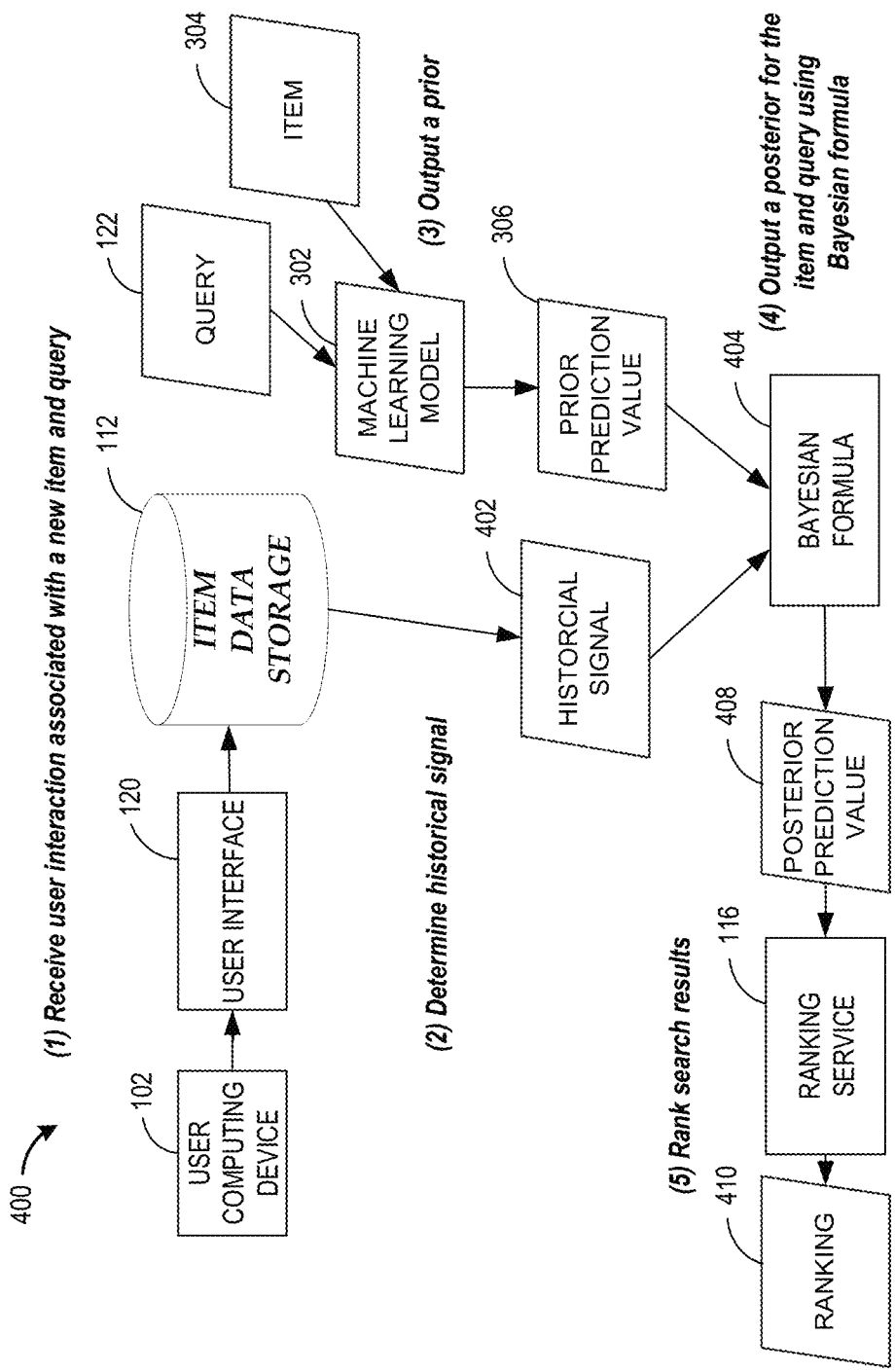
FIG. 4 is a flow diagram depicting illustrative interactions for calculating a posterior, used for ranking, based on user interaction data and a Bayesian formula.

With reference to FIG. 4, illustrative interactions are depicted related to receiving user interaction data, determining historical data, and calculating a posterior using a Bayesian formula. The environment 400 of FIG. 4 can be similar to the environments 100, 300 of FIGS. 1 and 3, respectively. The depicted interactions in FIG. 4 are example interactions, some or all of which may be optional depending on the circumstances or embodiment. Other interactions (not illustrated) may be possible in accordance with the present disclosure in other embodiments. Similar to the communication depictions of FIGS. 1 and 3, not every possible communication may be depicted in FIG. 4. Moreover, the interactions described below with respect to FIG. 4 may be similar to and/or occur subsequent to the interactions described above with respect to FIG. 3. For example, in FIG. 4, the user interaction data for a new item can be received after the prior prediction value 306 has been calculated, as described above with respect to FIG. 3.

At step one (1), the user interface 120 can receive a user interaction associated with a new item (later shown as the item 304 used by the machine learning model 302). The user interaction can be a selection, acquisition, or a consumption of the new item 304 by a user. User interaction data associated with the user interaction can be stored in the item data storage 112. At step two (2), the cold-start service 110 (not shown) can determine a historical signal 402. For example, the cold-start service 110 can determine a user selection rate, such as a ratio of user selections for a particular item and query to a total number of views for the particular item and query. At step three (3), the cold-start service 110 can apply the machine learning model 302 to an item 304 and a query 122 pair to output a prior prediction value 306. The application of the machine learning model 302 to the item 304 and the query 122 pair to output the prior prediction value 306 at step three (3) can be same as or similar to the application of the machine learning model 302 at step four (4) described above with respect to FIG. 3.

At step four (4), the cold-start service 110 can output a posterior prediction value 408 using the prior prediction value 306, the historical signal 402, and a Bayesian formula 404. As described above, the historical signal 402 can indicate the user interaction with the new item 304. An example Bayesian formula 404 is shown in the below equation.

$$P(A|D) = \frac{P(A)P(D|A)}{P(D)}$$

P(A) is the prior prediction value for the item query pair, P(D) is the likelihood of the historical signal, P(D|A) is the likelihood of the historical signal given the item query pair, and P(A|D) is a posterior. The cold-start service 110 can generate a posterior prediction value 408 for the item 304 and query 122 pair. The posterior prediction value 408 can quantify predicted user interactions with the item 304 and the query 122, such as impressions, acquisitions, or selections, which can be referred to as behavioral features.

Additional details regarding calculating a posterior prediction value are described below with respect to block 518 of FIG. 5.

At step five (5), the search results can be ranked by the ranking service 116 and the ranking service 116 can output a ranking 410. In particular, the ranking service 116 can apply a ranking model (not illustrated), such as a learning-to-rank model, that receives the posterior prediction value 408 for the item 304 and the query 122 as input in addition to a list of other item query pairs with respective prior prediction or posterior prediction values. The ranking model can use a posterior prediction value since the item 304 has a historical signal 402 as calculated with the Bayesian formula 404 based on user interaction data.

Figure 5:
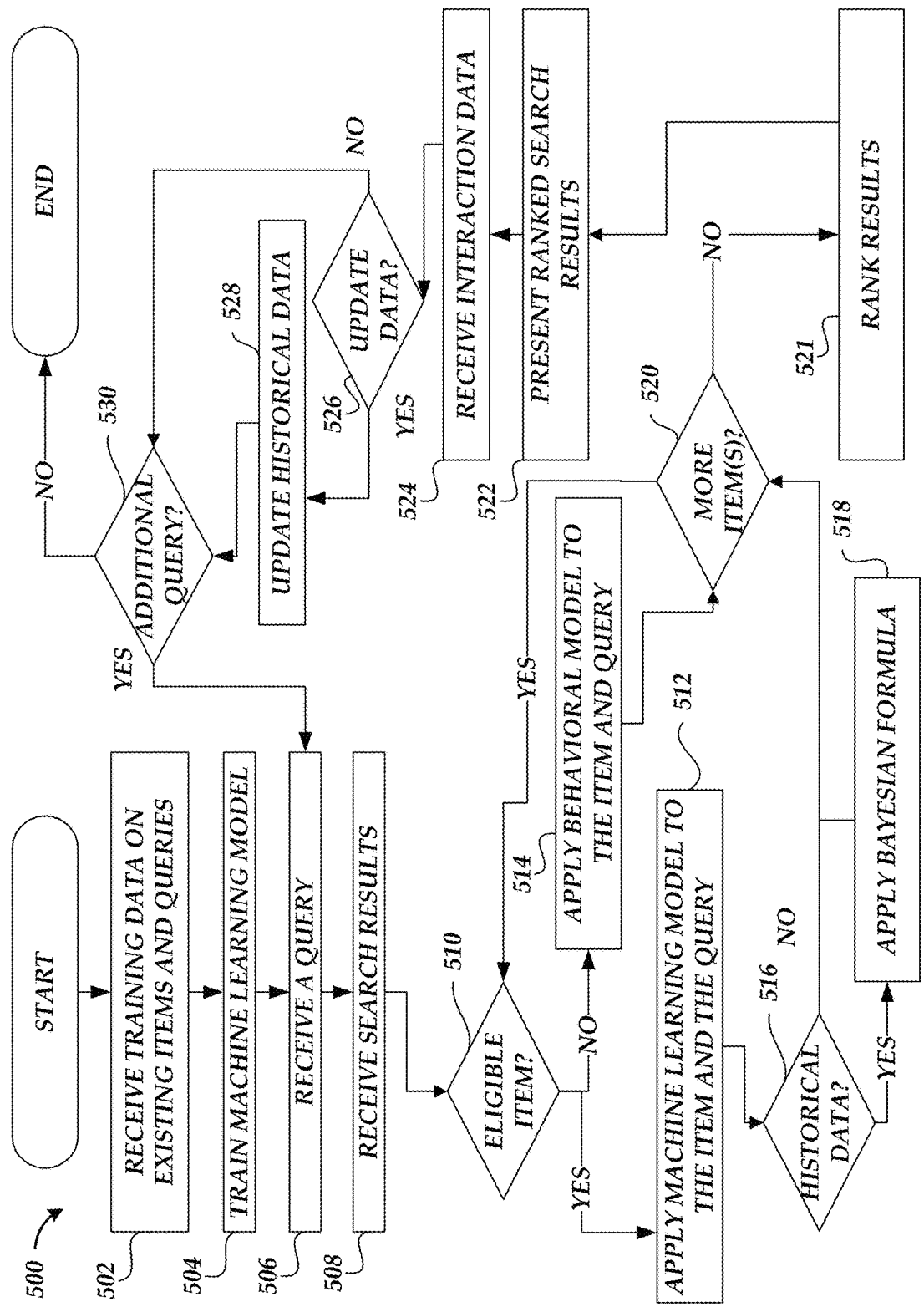
FIG. 5 is a flow chart depicting an example method for machine learned ranking of items and queries lacking user interaction data and calculating a posterior using a Bayesian formula.

FIG. 5 is a flow diagram depicting an example method 500 implemented by the search system 104 for machine learned ranking of items and queries lacking user interaction data and ranking items and queries with minimal user interaction data using a Bayesian formula. As described herein, the search system 104 may include the cold-start service 110. In some embodiments, the cold-start service 110 may include the cold-start application 216 and may implement aspects of the method 500. Some aspects of the method 500 may be implemented by other components of the search system 104, such as the user interface 120, the query service 108, the ranking service 116, and/or the behavioral service 118. Moreover, some aspects of the method 500 may be described above with respect to FIGS. 3 and 4.

Beginning at block 502, training data on existing items can be received. For example, the cold-start service 110 can receive the training data. In some embodiments, the cold-start service 110 can generate the training data. For example, the cold-start service 110 can receive item and query data. The cold-start service 110 can extract attributes from the item and query data and transform the attribute values into a feature vector. For a particular item, the cold-start service 110 can transform the attributes (for example, author, artist, brand, studio, writer, product type, director, subject, and/or genre) of the item into a feature vector that includes a series of numbers (for example, [$a_1$, $a_2$, $a_3$, $a_4$, etc.]). A feature vector can be a numerical representation of the attribute value. The attribute value can be a textual string. There can be a one-to-one correspondence between a numerical representation of an attribute value and the attribute value itself. For example, "Jane Barron" can be assigned a numerical value of 1 in a feature vector and "John Morris" can be assigned a numerical value of 12 in a different feature vector. Thus, the training data can include attributes in a feature vector format. The training data can further include user interaction data, such as historical signals indicating prior user interactions with an existing item and query. Example historical signals can include a number of selections (e.g., clicks) for a particular brand received during a time period, a number of times movies of particular actor were consumed, or number of acquisitions of content by a particular author. Additional historical signals can indicate selections (e.g., clicks), acquisitions, or views of an item. In some embodiments, new items may not be present in the training data and/or a new item may lack any historical signal. Additionally or alternatively, the training data may lack any historical signal for a new item.

At block 504, the machine learning model can be trained. For example, the cold-start service 110 can train the machine learning model with the training data. In the model, the likelihood of user engagement with an item query pair and/or desirability of an item query pair can be estimated based on the historical signals associated with attributes (such as brand, type, color, artist, author, query text, etc.) from existing item and query pairs. For example, historical signals can include a number of selections (e.g., clicks) for a particular brand and query received during a time period, a number of times movies of particular actor and query were consumed, or number of acquisitions of content for a particular author and query. The signals are fed to the machine learning model to learn interactions between attribute(s) and a behavioral feature, which would serve as a prior for a new item and query. The machine learning model can include a user engagement feature, such as a user selection rate feature, an acquisition rate feature, or a consumption rate feature.

In some embodiments, the machine learning model can include a tree, such as a decision tree. The tree can have multiple leaf nodes. Each leaf node of the tree can include another machine learning model, such as a logistic regression model. In some embodiments, each node of the tree before the leaf can be a decision node. A decision node can determine a query frequency and/or query specificity (for example, based on historical data, a query is more specific if it is predicted to have less results; conversely, a query is less specific it is predicted to have more results) and make a decision to select a next node in the tree. In some embodiments, each logistic regression model can use different features to make a prediction. An example machine learning model can be a decision tree of depth two with eight leaf nodes where each leaf node has a logistic regression model. The input to each logistic regression model can be the query and an item. In some embodiments, the cold-start service 110 can jointly train the sub-models of the machine learning model, such as the tree and the logistic regression model(s). For example, the cold-start service 110 can use a gradient descent training process to determine the cut offs for each decision node and/or the parameters for each logistic regression model.

However, the method 500 can be agnostic to the particular type of machine learning model. In some embodiments, the machine learning model can be or include a linear regression model. In other embodiments, the machine learning model can be or include an ensemble model, such as a gradient boosted decision tree model or a random forest model.

In some embodiments, the machine learning model can be or include a regression model conditioned on item metadata (such as the attributes and/or historical signals) as shown in the below equation.

$$P_j^i = f(x_i, x_j, x_{ij})$$

$P_j^i$ can be a prior prediction value for behavioral feature j (e.g., user selection rate) for item i, $x_i$ can be a vector of featurized attributes of item i, $x_j$ can be a vector of featurized attributes of query j, and $x_{ij}$ can be a vector of featurized attributes of item i and query j.

The machine learning model can be trained on behavioral features such as user engagement features. The behavioral features can represent some form of user engagement. Value(s) for the behavioral feature(s) for a particular item and query pair can be priors (an estimate based on other items' historical data) or can be posteriors (based on the particular item's history). The following are example behavioral features that can be included in the machine learning model. Moreover, each of the following example features can be calculated based on a period of time, selections or acquisitions over the last thirty days or single day, etc. A user selection rate feature can indicate a ratio of user selections for a particular item and query to a total number of views for the particular item and query, which can also be known or referred to as impressions. For example, the user selection rate can indicate the rate at which a user "clicks" on a search result for an item and query versus the number of times that search result is presented to a user based on the query. An acquisition rate feature can indicate a ratio of user acquisitions of a particular item and query to a total number of views for the particular item and query (e.g., impressions). A consumption rate feature can indicate a ratio of consumptions of a particular item and query to a total number of consumptions.

At block 506, a query can be received. In particular, the user interface 120 can receive a query. The query can include one or more search terms. In an electronic catalog context, a user can search for an item to view, acquire, or consume, such as a music album or a movie. For example, a user can submit the name of an artist or an author in the user interface 120 to search for items.

At block 508, search results can be received. For example, the query service 108 can identify or receive search results based at least in part on the search query. As described herein, the search results can include a new item or an item with minimal or no user interaction data. For example, the query service 108 can use a natural language and/or keyword search to retrieve the search results.

At block 510, for ranking purposes, it can be determined whether an item from the search results is eligible as a cold-start item. For example, the cold-start service 110 can determine whether the corresponding item in the item query pair should be passed to a cold-start machine learning model to output a prior or should be passed to another machine learning model to output a posterior, such as a behavioral machine learning model. In some embodiments, the cold-start service 110 can determine whether an item qualifies as a cold-start item based on one or more conditions. One condition can be whether the item has been available to be included as a search result for less than a period of time, such as ninety days. Additionally or alternatively, another condition can be whether the item query pair has sufficient interaction data to be passed to a behavioral machine learning model to output a posterior. In some embodiments, even if an item has recently been added to a catalog of the search system 104, but the corresponding item query pair has sufficient interaction data, then the cold-start service 110 can determine that the item is ineligible as a cold-start item.

At block 512, if the item is eligible as a cold-start item, a machine learning model can be applied to an item and the query to output a prior. For example, the cold-start service 110 can apply the machine learning model to the item and query pair to output a prior. As described herein, the item can be a new item and/or can have minimal or no user interaction data. Input to the machine learning model can include a feature vector of the attributes for the item and query. Output of the machine learning model can include a prior prediction value for the item where the item lacks user interaction data. One or more prior prediction values for a behavioral feature can be generated for an item, such as a user selection rate feature (e.g., a click rate), an acquisition rate feature (e.g., a purchase rate), or a consumption rate. The machine learning model can generate the prior prediction value based at least in part on (i) a correspondence between a respective attribute value of the input item and query and an existing item and query and (ii) the historical signal for the existing item and query. For example, if an artist's last album (an existing item) was presented in search results and resulted in acquisitions, then a new album (a new item) and query may receive a relatively high prior prediction value because the new album query pair and the existing album query pair share the same artist according to the machine learning model. In particular, if a first feature vector for a first item query pair has a first value that matches a second value of a second feature vector for a second item query pair, the machine learning model can determine that there is some correspondence between the first item query pair and the second item query pair. The prior prediction value can be an estimate of the likelihood of user engagement with the item query pair.

As described herein, in some embodiments, the machine learning model can include a tree and each leaf of the tree can include a regression model, such as a logistic regression model. In those embodiments, applying the machine learning model by the cold-start service 110 can include determining a frequency of the query and selecting, from the tree, a logistic regression model based at least in part on the frequency. For example, the internal decision nodes can determine a query frequency and/or query specificity and make a decision to select a next node in the tree. As described above at block 504, the machine learning model can be trained to make those decision(s) at decision node(s) to select a corresponding model at a leaf node.

At block 516, it can be determined whether there is sufficient historical data to apply a Bayesian formula to the prior determined at the previous block 512. For example, the cold-start service 110 can determine whether there is sufficient historical data to apply a Bayesian formula to the prior determined at the previous block 512. If there is not sufficient historical data, the method 500 can proceed to block 520 to check if there are additional items in the search results for processing. For example, on a subsequent pass, there can be items that do not qualify at cold-start items and the method can proceed to block 514 to apply a behavioral model.

At block 514, if the item is ineligible as a cold-start item, a behavioral machine learning model can be applied to an item and the query to output a posterior. For example, the behavioral service 118 can apply another machine learning model to output a posterior, as described herein. At block 520, it can be determined whether there are more items that need a prior or a posterior for ranking purposes. If there are more items, the method 500 can return to block 510 to process those additional items. If there are no more items, the method 500 process to block 521 to rank search results.

At block 521, if there are no more items that need a prior or posterior, the query results can be ranked. For example, the ranking service 116 can use the prior prediction and/or the posterior prediction value(s) for ranking. The ranking service 116 can apply a ranking model to search results. Input to the ranking model can include the prior prediction and/or the posterior prediction value(s) for the item query pairs. Output of the ranking model can indicate a rank for the item relative to another item included in the search results. Depending on the availability of user interaction data for item query pairs, the ranking model can use a prior prediction value or a posterior prediction value for each item query pair. The ranking model can apply a lexical similarity function to textual attributes associated with at least one of an item or query. The ranking model can be trained based on example lexical similarity functions such as, but not limited to, BM25 or term frequency-inverse document frequency (TF-IDF). Accordingly, the ranking service 116 can rank new item query pairs and existing item query pairs against one another.

At block 522, ranked search results can be presented. For example, the user interface 120 can present at least some of the search results in a ranked order. The user interface 120 can present at least some of the search results and the item (which can be a new item or an item with minimal or no user interaction data) based at least in part on the rank. For a new item query pair that did not have any user interaction data, the prior prediction value for a type of user engagement can indicate that a new item query pair may be desired highly relative to other items. This can be reflected in the rank. Similarly, for a new item query pair that has minimal user interaction data, a calculated posterior prediction value for a type of user engagement can indicate that a new item query pair may be desired highly relative to other items. Thus, presentation of the item can be shown in a manner (such as by being presented before other items) that indicates the determined ranking of the item relative to other items in the search results. For example, a rank for a first item can be the numerical value one, a rank for a second item can be the numerical value ten, and thus the rank for the first item can indicate that the first item should be given a higher relevance in the search results relative to the second item. An example ranking can be a list of ranks, where each rank in the list indicates a position for an item relative to the other items in the ranking.

At block 524, interaction data can be received. For example, the user interface 120 can receive user interactions. For example, via the user interface 120, a user can select, acquire, or consume a particular item after a query execution. Data representing these captured interactions can be stored and used for training. The interaction data can be for new or existing items. As described herein, the interaction data can be used in a Bayesian formula to calculate a posterior.

At block 526, it can be determined whether to update data. For example, the cold-start service 110 can determine to update historical data (such as historical signals) on a periodic basis (such as hourly or once a day), an aperiodic basis, and/or on-demand. If the historical data should be updated, the method 500 can proceed to block 528 to update historical data. For example, the cold-start service 110 can update historical data and receive historical signals. In some embodiments, the cold-start service 110 can determine a user selection rate, such as a ratio of user selections for a particular item and query to a total number of views for the particular item and query. After updating the historical data, the method 500 can proceed to block 530 to determine whether there are additional queries. If it is not time to update the historical data, the method 500 can directly proceed to block 530 to determine whether there is an additional query.

At block 530, it can be determined whether there is an additional query to be processed. The user interface 120 can receive additional queries that can be forwarded to the query service 108 for processing. For example, a single user can submit multiple queries to the search system 104 and/or multiple users can submit queries to the search system 104. If additional queries are received for processing, the method 500 can return to the block 506 to process the query and to the block 508 to receive search results and so forth. During processing of a subsequent query and item query pair, the method 500 can eventually return to the block 512 to apply the machine learning model to the item and query pair to receive a prior.

At block 516, it can be determined whether there is sufficient historical data to apply a Bayesian formula to the prior determined at the previous block 512. For example, the cold-start service 110 can determine that there is sufficient historical data to apply a Bayesian formula to the prior determined at the previous block 512.

At block 518, a Bayesian formula can be applied. The cold-start service 110 can calculate a posterior prediction value using at least the prior prediction value, a historical signal (from user interaction data), and a Bayesian formula. The historical signal can indicate the user interaction with the recently added item. As described above, an example Bayesian formula is the following equation.

$$P(A|D) = \frac{P(A)P(D|A)}{P(D)}$$

P(A) is the prior prediction value for the item query pair, P(D) is the likelihood of the historical signal, P(D|A) is the likelihood of seeing the historical signal given the item query pair, and P(A|D) is a posterior. As a result, after historical data has been updated and the method 500 returns to the block 518 for applying a Bayesian formula following receipt of a subsequent query, the cold-start service 110 can calculate a posterior prediction value for the item and query pair. The posterior prediction value can quantify predicted user interactions with the item and the query, such as impressions, acquisitions, or selections, which can be referred to as behavioral features.

In some embodiments, using the Bayesian formula can include calculating a posterior mean estimate from a Beta distribution of a user interaction rate. The Beta distribution can be a probability distribution on probabilities. For example, the Beta distribution can model the probabilities of a conversion rate of customers actually acquiring an item. In other embodiments, using the Bayesian formula includes applying Thompson sampling to the Beta distribution of a user interaction rate. Thompson sampling can include a likelihood function, a set of parameters of the distribution of rewards, a prior distribution on those parameters, past observations, and a posterior distribution. Thompson sampling can consist of playing each action according to the probability that it maximizes the expected reward. In each round, parameters can be sampled from the posterior, and an action can be chosen that maximizes the expected reward given the sampled parameters, the action, and the current context. In other embodiments, using the Bayesian formula includes applying an upper-confidence bound (UCB) algorithm to a Beta distribution of a user interaction rate. An upper-confidence bound algorithm can use uncertainty in the action-value estimates for balancing exploration and exploitation. An example UCB formula is shown below. In the below formula, $Q_t(a)$ represents the current estimate for action a at time t; and $N_t(a)$ is the number of times action a is taken.

$$A_t = \operatorname{argmax}\left(Q_t(a) + c\sqrt{\frac{\ln(t)}{N_t(a)}}\right)$$

The techniques described herein can take into account that user engagement with items changes over time (such as by either going up or down as the popularity of an item changes over time). For example, updated historical signals can be determined based on some frequency, such as hourly or once a day. Thus, since application of the Bayesian formula is a relatively fast operation and receiving updated historical signals can also occur relatively quickly, the cold-start service 110 can advantageously promote new items based on recently received user interaction data using recalculated posterior values for item query pairs including cold-start items.

At block 522, if a posterior prediction value has been calculated, then the search results can be ranked using the posterior prediction value calculated form the Bayesian formula. For example, the ranking service 116 can use the posterior prediction value calculated from a Bayesian formula for ranking. The ranking service 116 can apply a ranking model to search results using a posterior calculated from a Bayesian formula. Input to the ranking model can include the posterior prediction value for the item and query. The method 500 can proceed as described above to present the search results and receive further interaction data.

While many embodiments discuss herein use media items as an example, it will be appreciated that the systems and methods described herein for addressing cold-start issues in a search system can be applied to any other type of item. The machine learning techniques described herein can be applied to non-media items where there is metadata for the non-media items, such as attributes and/or historical data.

It is to be understood that not necessarily all objects or advantages may be achieved in accordance with any particular embodiment described herein. Thus, for example, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   under control of a computer hardware processor configured with specific computer executable instructions,
   generating training data comprising (i) a plurality of attributes for a first item query pair in a first feature vector, and (ii) a first historical signal indicating a first prior user interaction with the first item query pair, wherein the first item query pair comprises a first item and a previous query;
   training a first machine learning model using the training data;
   receiving a second item different from the first item, wherein the second item is not present in the training data;
   receiving a first query;
   identifying a plurality of search results based at least in part on the first query, wherein the plurality of search results includes the second item and a third item;
   determining that the second item is eligible to receive a prior;
   in response to determining that second item is eligible to receive a prior,
      applying the first machine learning model to the second item and the first query, wherein input to the first machine learning model comprises a second feature vector of the plurality of attributes for the second item and the first query as a second item query pair, wherein output of the first machine learning model comprises a prior prediction value for the second item query pair, and wherein the prior prediction value is based at least in part on (i) a correspondence between a respective attribute value of the second item query pair and the first item query pair, and (ii) the first historical signal;
   receiving a second historical signal indicating a second prior user interaction with the second item and a query;
   calculating a first posterior prediction value for the second item and the first query using at least (i) the second historical signal, (ii) the prior prediction value, and (iii) a Bayesian formula;
   determining that the third item is ineligible to receive a prior;
   in response to determining that third item is ineligible to receive a prior,
      applying a second machine learning model to the third item and the first query, wherein output of the second machine learning model comprises a second posterior prediction value for the third item and the first query; and
   causing presentation, according to a rank, of the plurality of search results based at least in part on the first posterior prediction value and the second posterior prediction value.

2. The computer-implemented method of claim 1, further comprising:
   applying a ranking model to the plurality of search results, wherein input to the ranking model comprises (i) the first posterior prediction value for the second item and the first query and (ii) the second posterior prediction value for the third item and the first query, and wherein output of the ranking model indicates the rank for the second item relative to the third item.

3. The computer-implemented method of claim 1, wherein using the Bayesian formula includes calculating a posterior mean estimate from a Beta distribution of a user interaction rate.

4. The computer-implemented method of claim 1, wherein using the Bayesian formula includes applying Thompson sampling to a Beta distribution of a user interaction rate.

5. The computer-implemented method of claim 1, wherein using the Bayesian formula includes applying an upper-confidence bound algorithm to a Beta distribution of a user interaction rate.

6. A system comprising:
a data storage medium; and
one or more computer hardware processors in communication with the data storage medium, wherein the one or more computer hardware processors are configured to execute computer-executable instructions to at least:
  receive training data comprising (i) a plurality of attributes for a first item query pair in a first feature vector, and (ii) a first historical signal indicating a first prior user interaction with the first item query pair;
  train a first machine learning model using the training data;
  receive a second item different from a first item of the first item query pair, wherein the second item lacks any historical signal;
  receive a first query;
  identify a plurality of search results based at least in part on the first query, wherein the plurality of search results includes the second item and a third item;
  determine that the second item is eligible to receive a prior;
  in response to determining that second item is eligible to receive a prior,
    apply the first machine learning model to the second item and the first query, wherein input to the first machine learning model comprises a second feature vector of the plurality of attributes for the second item and the first query as a second item query pair, wherein output of the first machine learning model comprises a prior prediction value for the second item query pair, and wherein the prior prediction value is based at least in part on (i) a correspondence between a respective attribute value of the second item query pair and the first item query pair, and (ii) the first historical signal;
  receive a second historical signal indicating a second prior user interaction with the second item and a query;
  calculate a first posterior prediction value for the second item and the first query using at least (i) the second historical signal, (ii) the prior prediction value, and (iii) a Bayesian formula;
  determine that the third item is ineligible to receive a prior;
  in response to determining that third item is ineligible to receive a prior,
    apply a second machine learning model to the third item and the first query, wherein output of the second machine learning model comprises a second posterior prediction value for the third item and the first query; and
  cause presentation, according to a rank, of the plurality of search results based at least in part on the first posterior prediction value and the second posterior prediction value.

7. The system of claim 6, wherein the first machine learning model comprises a user selection rate feature that indicates a ratio of user selections for a particular item and query pair to a total number of views for the particular item and query pair.

8. The system of claim 6, wherein the first machine learning model comprises an acquisition rate feature that indicates a ratio of user acquisitions of a particular item and query pair to a total number of views for the particular item and query pair.

9. The system of claim 6, wherein the first machine learning model comprises a consumption rate feature that indicates a ratio of consumptions a particular item and query pair to a total number of consumptions.

10. The system of claim 6, wherein the first machine learning model comprises:
a tree including a plurality of leaf nodes, wherein each leaf node of the plurality of leaf nodes includes a logistic regression model.

11. The system of claim 6, wherein the first machine learning model comprises a linear regression model.

12. The system of claim 10, wherein applying the first machine learning model comprises:
determining a frequency of the first query; and
selecting, from the tree, a first logistic regression model based at least in part on the frequency.

13. A system comprising:
a data storage medium; and
one or more computer hardware processors in communication with the data storage medium, wherein the one or more computer hardware processors are configured to execute computer-executable instructions to at least:
  receive training data comprising (i) a plurality of attributes for a first item query pair in a first feature vector, and (ii) a first historical signal indicating a first prior user interaction with the first item query pair;
  train a first machine learning model using the training data;
  receive a second item different from a first item of the first item query pair, wherein the training data lacks any historical signal for the second item;
  receive a first query;
  identify a plurality of search results based at least in part on the first query, wherein the plurality of search results includes the second item and a third item;
  determine that the second item is eligible to receive a prior;
  in response to determining that second item is eligible to receive a prior,
    apply the first machine learning model to the second item and the first query, wherein input to the first machine learning model comprises a second feature vector of the plurality of attributes for the second item and the first query as a second item query pair, wherein output of the first machine learning model comprises a prior prediction value for the second item query pair, and wherein the prior prediction value is based at least in part on (i) a correspondence between a respective attribute value of the second item query pair and the first item query pair, and (ii) the first historical signal;
  determine that the third item is ineligible to receive a prior;
  in response to determining that third item is ineligible to receive a prior,
    apply a second machine learning model to the third item and the first query, wherein output of the second machine learning model comprises a posterior prediction value for the third item and the first query;

apply a ranking model to the plurality of search results, wherein input to the ranking model comprises (i) the prior prediction value for the second item and the first query and (ii) the posterior prediction value for the third item and the first query, and wherein output of the ranking model indicates a rank for the second item relative to the third item; and cause presentation of at least some of the plurality of search results and the second item based at least in part on the rank.

14. The system of claim 13, wherein the one or more computer hardware processors are configured to execute further computer-executable instructions to at least:

receive a second historical signal indicating a second prior user interaction with the second item and a query;

receive a second query;

identify a second plurality of search results based at least in part on the second query, wherein the second plurality of search results includes the second item; and calculate a posterior prediction value for the second item and the second query using at least (i) the second historical signal, (ii) the prior prediction value, and (iii) a Bayesian formula.

15. The system of claim 13, wherein the ranking model applies a lexical similarity function to textual attributes associated with at least one of an item or query.

16. The system of claim 14, wherein the one or more computer hardware processors are configured to execute additional computer-executable instructions to at least:

apply the ranking model to the second plurality of search results, wherein input to the ranking model comprises the posterior prediction value for the second item and the second query, and wherein output of the ranking model indicates a second rank for the second item relative to another item included in the second plurality of search results; and cause presentation, according to a second rank, of the second plurality of search results.

17. The system of claim 14, wherein using the Bayesian formula includes calculating a posterior mean estimate from a Beta distribution of a user interaction rate.

18. The system of claim 14, wherein using the Bayesian formula includes applying Thompson sampling to a Beta distribution of a user interaction rate.

19. The system of claim 14, wherein using the Bayesian formula includes applying an upper-confidence bound algorithm to a Beta distribution of a user interaction rate.

20. The system of claim 10, wherein training the first machine learning model comprises:

training a first logistic regression model using at least some of the training data.

* * * * *